3,200,139
β-SULFATOSULFONAMIDES
Donald L. Klass, Barrington, Ill., assignor to The Pure Oil Company, Chicago, Ill., a corporation of Ohio
No Drawing. Filed Dec. 22, 1960, Ser. No. 77,528
21 Claims. (Cl. 260—458)

This invention relates to β-sulfatosulfonamides and their metal salts as surfactants or ingredients in surfactant compositions. More particularly, this invention relates to β-sulfatosulfonamides and their salts obtained by reacting an olefin with sulfur trioxide in complexed form, using a sulfur trioxide/olefin mole ratio of about 2/1 and subsequently reacting the resulting product with a primary or secondary amine, in an amine/olefin mole ratio of about 2/1. Another aspect of the invention comprises surfactant alkali and alkaline earth metal salts of β-sulfatosulfonamides, prepared by using an alkali or alkaline earth metal oxide or hydroxide in place of the amines mentioned supra.

In accordance with this invention, I have discovered that the β-sulfatosulfonamides and their salts are excellent surface-active agents, particularly when the olefin from which they are derived contains at least 8 carbon atoms. More specifically, I have discovered that by reacting about 1 mole of an olefin such as dodecene-1 with about 2 moles of a sulfur trioxide complex at a temperature of about −10° to 120° C., followed by reaction of the product with a primary or secondary amine, results in a highly useful surfactant composition. Also as an aspect of this invention, I have discovered that the reaction product of the foregoing amine salt with an alkali metal or alkaline earth metal oxide or hydroxide produces an extremely useful detergent composition.

The compounds of my invention may be represented by the formula:

(I)
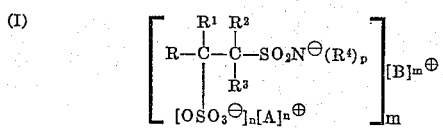

wherein R, $R^1$, $R^2$ and $R^3$ are hydrogen or non-polar organic radicals or hydrocarbon radicals containing from 1 to 20 carbon atoms, the total number of carbon atoms in R, $R^1$, $R^2$ and $R^3$ being at least 6, said hydrocarbon radicals including alkyl, aryl, alkaryl, aralkyl and cycloparaffinic radicals, this portion of the molecule being derived from olefins having a terminal or internal olefinic double bond; $R^4$ is hydrogen or an organic radical or a hydrocarbon radical containing from 1 to 20 carbon atoms including alkyl, hydroxy alkyl, aryl, phenolic, alkaryl, aralkyl, heterocyclic, hydroxycycloparaffinic and cycloparaffinic radicals, derived from ammonia, primary or secondary amines forming the sulfonamide group in the molecule, and $p$ has a value of 1 or 2, A is a cation having a valence of $n$, and is derived from ammonia, a primary amine, a secondary amine, a tertiary amine, and ammonia, mixtures of primary and secondary amines, mixtures of ammonia and primary amines or mixtures of ammonia and secondary amines, or may be an alkali metal, such as sodium, potassium, lithium, cesium, or rubidium, or may be an alkaline earth metal such as barium, calcium, strontium or magnesium and $n$ has a value of 1 or 2; B is a cation such as hydrogen or any alkali or alkaline earth metal as just enumerated and $m$ is the valence of B, which may be 1 or 2. A preferred sub-genus under this formula comprises the β-sulfatosulfonamides and their salts, or β-sulfatosulfonanilides and their salts, derived from alpha-olefins in which case $R^1$, $R^2$ and $R^3$ are hydrogen, and the remaining substituents are as just defined.

The primary object of this invention is to provide a surfactant of the foregoing formula.

An object of the invention is to provide β-sulfatosulfonamides as surfactants.

An object of the invention is to provide β-sulfatosulfonanilides as surfactants.

Another object of the invention is to provide salts of β-sulfatosulfonamides as surfactants and detergents.

Another object is to provide salts of β-sulfatosulfonanilides as surfactants.

Another object is to provide salts of β-sulfatosulfonamides and salts of β-sulfatosulfonanilides, derived from terminal olefins having at least 8 carbon atoms, as surfactants and detergents.

A further object is to provide the anilinium salt of 2-hydrosulfato-1-dodecane sulfonanilide and the alkali metal salts thereof as surfactant and detergent agents.

These and other objects of this invention will be described or become apparent as the specification proceeds.

The compounds defined by the foregoing formula are prepared from either internal or terminal olefins having at least 8 carbon atoms, by reaction of about 1 mol of the olefin with at least about 2 mols of sulfur trioxide in complexed form followed by reaction of the resulting intermediate with ammonia, a primary amine, a secondary amine, a mixture of ammonia and a tertiary amine, mixtures of primary and secondary amines, mixtures of ammonia and a primary or secondary amine, etc., to form the β-sulfatosulfonamide from terminal olefins, or the corresponding internal sulfatosulfonamide from internal olefins, using at least about 2 mols of the ammonia, amine, or ammonia-amine mixture, or the amine mixture, per mol of olefin reactant.

For maximum yields of the products, the minimum quantity of about 2 mols of sulfur trioxide complex and minimum quantity of about 2 mols of ammonia or amine-ammonia, or amine mixtures should be used. The reaction proceeds with slightly less than 2 mols of sulfur trioxide complex, and with less than 2 mols of ammonia and/or amine etc., but the yields are greatly reduced. The use of more than 2 mols of sulfur trioxide and/or more than 2 mols of ammonia etc. is not excluded and up to 4 mols of each per mol of olefin reactant may be used. The best results are obtained when the molar ratios of reactants are maintained at about 2/1 in the order stated.

The resulting β-sulfatosulfonamides have been found to have surfactant properties in themselves or may be converted to the alkali or alkaline earth metal salts which also have surfactant properties. The β-sulfatosulfonamides can be formed from ammonia, a primary amine, or a secondary amine in the second step of the reaction, and the salt can be formed at the sulfato group (as indicated by the cation A) and at the amine group (as indicated by B in the formula). It is apparent that if a reactive hydrogen is not present on the nitrogen atom of the sulfonamide group, only the sulfato salt can be formed. Thus, in the formula, B may be absent, that is, be an $R^4$ group or hydrogen in which case $m$ is equal to 1. Consequently, when it is desired to form either the mixed salt wherein A is an ammonia or amino group, and B is a metal as herein defined, or the di-metallic salt, i.e., with one metal ion (A) attached to the sulfato group and another (B) attached to the amide group, a primary amine must be used in the second-stage reaction. The relationship of constituent groups is shown in Table I.

centration of the filtrate yielded a second portion of (I), weighing 160 g. Recrystallization of a small sample of the first portion of (I) from water yielded substantially pure product, in the form of white needles having a melting point of 115°–119° C. At a 0.1% concentration, this product formed suds in neutral, acidic, and basic solutions. The purified product consumed 2 equivalents of alkali when titrated with aqueous base.

TABLE I

| Reactant [1] | Product | | |
|---|---|---|---|
| | "A" Group [3] | Sulfonamide group | "B" Group |
| $NH_3$ | $\overset{\oplus}{N}H_4$ | $-SO_2\overset{\ominus}{N}H$ | Any alkali or alkaline earth metal or hydrogen. |
| $R^4NH_2$ | $\overset{\oplus}{N}H_3R^4$ | $-SO_2\overset{\ominus}{N}R^4$ | Any alkali or alkaline earth metal or hydrogen. |
| $(R^4)_2NH$ | $\overset{\oplus}{N}H_2(R^4)_2$ | $-SO_2N(R^4)_2$ | Absent. |
| $NH_3, (R^4)_3N$ [2] | $\overset{\oplus}{N}H(R^4)_3$ | $-SO_2\overset{\ominus}{N}H$ | Any alkali or alkaline earth metal or hydrogen. |
| $R^4NH_2, (R^4)_3N$ [2] | $\overset{\oplus}{N}H(R^4)_3$ | $-SO_2\overset{\ominus}{N}R^4$ | Any alkali or alkaline earth metal or hydrogen. |
| $(R^4)_2NH, (R^4)_3N$ [2] | $\overset{\oplus}{N}H(R^4)_3$ | $-SO_2N(R^4)_2$ | Absent. |
| $R^4NH_2, (R^4)_2NH$ | $\overset{\oplus}{N}H_3R^4$ and/or $\overset{\oplus}{N}H_2(R^4)_2$ | $-SO_2N(R^4)_2$ / $-SO_2\overset{\ominus}{N}R^4$ | Absent. / Any alkali or alkaline earth metal or hydrogen. |
| $NH_3R^4NH_2$ | $\overset{\oplus}{N}H_4$ and/or $\overset{\oplus}{N}H_3R^4$ | $-SO_2\overset{\ominus}{N}R^4$ / $-SO_2\overset{\ominus}{N}H$ | Any alkali or alkaline earth metal or hydrogen. / Any alkali or alkaline earth metal or hydrogen. |
| $NH_3, (R^4)_2NH$ | $\overset{\oplus}{N}H_4$ and/or $\overset{\oplus}{N}H_2(R^4)_2$ | $-SO_2N(R^4)_2$ / $-SO_2\overset{\ominus}{N}H$ | Absent. / Any alkali or alkaline earth metal or hydrogen. |

[1] When a single reactant is used, 2 molar equivalents are required; when 2 reactants are used, 1 molar equivalent of each is required.
[2] Tertiary amines cannot be used alone. They must be used in combination with primary amines, secondary amines or ammonia to obtain the products of this invention.
[3] All of the amine and ammonium groups listed in the "A" group column can be replaced by alkali or alkaline earth metals.

Only those internal olefins may be used which are sufficiently reactive with the sulfur trioxide complex to produce the intermediates from which the sulfonamides of this invention are derived. Certain species of internal olefins may be sterically hindered and require more severe reaction conditions and longer contact times, or both, during reaction with the sulfur trioxide complex.

The invention is demonstrated by the following non-limiting examples.

*Example 1*

A 168-g. (1 m.) portion of dodecene-1 was added to the complex prepared from 160 g. (2 m.) of sulfur trioxide and 176 g. (2 m.) of dioxane in 400 ml. of ethylene dichloride at 0° C. The temperature of the mixture was held at 0° to 5° C. during the addition, which required about 1.5 hours. Then the reaction mixture was kept at 0° C. for 1 day, and at –18° C. for 3 days, after which it was treated with 186 g. (2 m.) of aniline, with stirring and cooling at 0° C. The resulting reaction mixture was stirred at room temperature for 1 day and kept at –18° C. for 2 days, during which time a solid mass of the anilinium salt of 2-hydrosulfato-1-dodecanesulfonanilide, having the formula, (I) 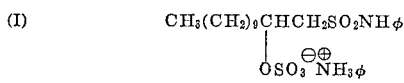

was formed. The resulting mixture was filtered to recover a first portion (I), weighing 112 g. Further con-

*Example 2*

A 46-mg. portion of the product from Example 1 was treated with 0.86 ml. of 0.1035 N potassium hydroxide solution to form the mono-potassium salt of 2-hydrosulfato-1-dodecanesulfonanilide, having the formula, (II) 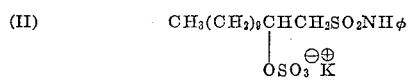

The resulting solution was brought up to a total volume of 50 ml. by adding distilled water, to yield a 0.1% solution of (II). The solution contained a very small amount of aniline.

*Example 3*

A 42-mg. portion of the product from Example 1 was treated with 1.58 ml. of 0.1035 N potassium hydroxide solution to form the di-potassium salt of 2-hydrosulfato-1-dodecanesulfonanilide, having the formula, (III) 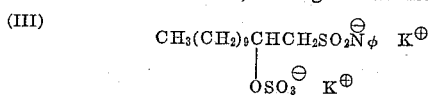

The volume of the resulting solution was increased to 50 ml. by adding distilled water, yielding a 0.1% solution of (III). The solution contained a very small amount of free aniline.

The 0.1% solutions of Compounds I, II, and III were shaken 25 times in a 250 ml. Erlenmeyer flask to determine the amounts of suds formed, with the following results:

| Compound | Appearance of solution | Suds rating at room temperature* | Time to suds disappearance |
|---|---|---|---|
| I | Clear | 4 | 1 hours. |
| II | Slightly turbid. | 3 | 2 hours. |
| III | Clear | 5 | 15 minutes. |

*The suds-forming properties were rated according to an arbitrary scale wherein a rating of 1 was assigned when the flask was filled with suds and a rating of 10 was assigned when no suds formed. Thus, a rating of 3 indicates that 70% of the flask was filled with suds, a rating of 4 indicates that 60% of the flask was filled, etc.

Example 4

A 1-mole portion of decene-1 is added to a 160-g. (2 mole) portion of sulfur trioxide and 176-g. (2 mole) portion of dioxane in complexed form carried by about 500 ml. of ethylene trichloride at 10° C. The mixture is maintained at about 10° C. for 2 hours during the addition of these ingredients. Following this, the reaction mixture is maintained at about 0° C. for a period of 5 days and then is treated with a 2-mol (186 g.) portion of aniline. The reaction mixture is stirred at room temperature for about 12 hours and kept at −10° C. for 2 days. A solid mass of 2-hydrosulfato-1-decane sulfonanilide having the formula, (IV) 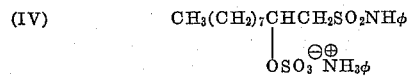

is formed. The mixture is filtered to recover the product IV and the filtrate is concentrated by the application of heat to recover a second portion of the product IV. At small concentrations, this product forms voluminous suds in neutral, acidic, and basic aqueous solutions. The purified product consumes about 2 equivalents of alkali when titrated with an aqueous base, i.e., 0.1 N sodium hydroxide.

Example 5

The 2-hydrosulfato-1-decanesulfonanilide of Example 4 is treated with 0.1 N barium hydroxide octahydrate to form barium di-(2-hydrosulfato-1-decanesulfonanilide), having the formula, (V) 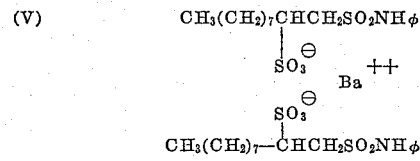

Example 6

The 2-hydrosulfato-1-decanesulfonanilide of Example 4 is treated with 0.1 N barium hydroxide octahydrate to form the di-barium salt of di-(2 hydrosulfato-1-decane-sulfonanilide), having the formula, (VI) 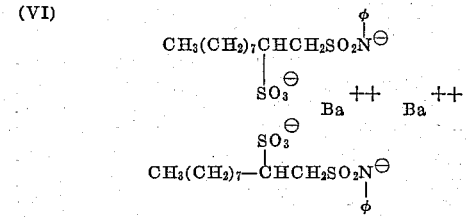

Example 7

The procedure of Example 1 is repeated using tridecene-1 in place of dodecene-1 to prepare the anilinium salt of 2-hydrosulfato-1-tridecane sulfonanilide having the formula, (VII) 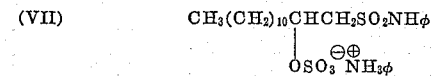

and having excellent surfactant properties.

Example 8

The anilinium salt of 2-hydrosulfato-1-tridecane sulfonanilide Compound VII of Example 7 is reacted with 0.1 N calcium hydroxide solution to form calcium di-(2-hydrosulfato-1-tridecanesulfonanilide), having the formula, (VIII) 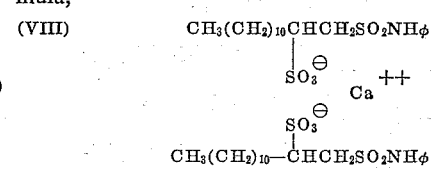

Example 9

The calcium di-(2-hydrosulfato-1-tridecanesulfonanilide), Compound VIII of Example 8 is reacted with 0.1 N sodium hydroxide to form the sodium-calcium di-(2-hydrosulfato-1-tridecane sulfonanilide), having the formula, (IX) 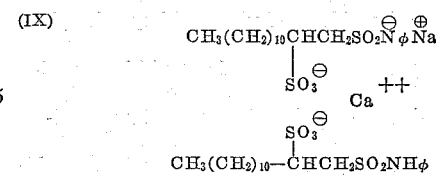

or with calcium hydroxide to form di calcium di-(2-hydrosulfato-1-tridecane sulfonanilide), having the formula, (X) 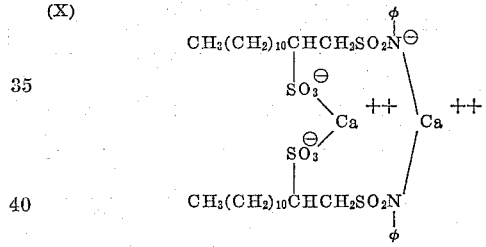

By following the procedures of the examples, a number of species of compounds coming within the definitions of the invention can be prepared, such as, 2-anilinium-hydrosulfato-2-phenyl-1-dodecanesulfonanilide
2-anilinium-hydrosulfato-2-naphthyl-1-dodecanesulfonanilide
2-anilinium-hydrosulfato-2-anthryl-1-dodecanesulfonanilide
2-anilinium-hydrosulfato-2-paramethylphenyl-1-dodecanesulfonanilide
2-anilinium-hydrosulfato-2-cyclohexyl-1-dodecanesulfonanilide
2-anilinium-hydrosulfato-2-phenylethyl-1-dodecanesulfonanilide
2-anilinium-hydrosulfato-2-phenylpropyl-1-dodecanesulfonanilide
2-anilinium-hydrosulfato-2-cyclopentyl-1-dodecanesulfonanilide
2-anilinium-hydrosulfato-2-benzyl-1-dodecanesulfonanilide
2-mono-potassium-hydrosulfato-2-phenyl-1-dodecanesulfonanilide
2-mono-sodium-hydrosulfato-2-naphthyl-1-dodecanesulfonanilide
2-mono-cesium-hydrosulfato-2-anthryl-1-dodecanesulfonanilide
2-mono-sodium-hydrosulfato-2-benzyl-1-dodecanesulfonanilide
Potassium salt of 2-mono-potassium-hydrosulfato-2-phenyl-1-dodecanesulfonanilide
Sodium salt of 2-mono-sodium-hydrosulfato-2-cyclohexyl-1-dodecanesulfonanilide Cesium salt of 2-mono-cesium-hydrosulfato-2-paramethylphenyl-1-dodecanesulfonanilide Barium-di-(2-hydrosulfato-2-methyl-1-dodecanesulfonanilide)

Calcium-di(2-hydrosulfato-1-phenyl-1-decanesulfonanilide)

Strontium-di(2-hydrosulfato-1-anthryl-1-tridecanesulfonanilide)

Di-barium salt of 2-hydrosulfato-1-ethyl-1-tetradecanesulfonanilide

Di-calcium salt of 2-hydrosulfato-1-t-butyl-1-tetradecanesulfonanilide

Di-strontium salt of 2-hydrosulfato-1-cyclopentyl-1-tridecanesulfonanilide 2-methylamino-hydrosulfato-1-tetradecane-N-methylsulfonamide 2-ethylaminohydrosulfato-1-dodecane-N-propylsulfonamide 2-butylaminohydrosulfato-1-octane-N-amylsulfonamide 2-amylaminohydrosulfato-1-tridecane-N-cyclopentylsulfonamide 2-dipropylaminohydrosulfato-1-dodecane-N-cyclohexylsulfonamide 2-undecylaminohydrosulfato-1-pentadecane-N-benzylsulfonamide 2-dihexylamylaminohydrosulfato-1-nonane-N-nonylsulfonamide Sodium salt of 2-decylaminohydrosulfato-1-decane-N-methyl sulfonamide Potassium salt of 2-hexylaminohydrosulfato-1-dodecane-N-butylsulfonamide Cesium salt of 2-benzylaminohydrosulfato-1-undecane-N-propylsulfonamide Lithium salt of 2-methylaminohydrosulfato-1-octane-N-cyclopentylsulfonamide Barium salt of di(2-butylaminohydrosulfato-1-dodecane-N-benzylsulfonamide)

Calcium salt of di(2-cyclohexylaminohydrosulfato-1-undecane-N-anthryl sulfonamide)

Strontium salt of di(2-decylaminohydrosulfato-1-dodecane-N-naphthylsulfonamide)

Di-barium salt of 2-hydrosulfato-1-tetradecane-N-methylsulfonamide

Di-calcium salt of 2-hydrosulfato-1-undecane-N-propylsulfonamide

Di-strontium salt of 2-hydrosulfato-1-tridecane-N-benzylsulfonamide

Barium salt of barium-di(2-hydrosulfato-2-phenyl-1-decane-N-octylsulfonamide)

Calcium salt of calcium-di(2-hydrosulfato-2-isopropyl-1-tetradecane-N-cetylsulfonamide)

Strontium salt of strontium-di(2-hydrosulfato-2-benzyl-1-pentadecane-N-cyclohexylsulfonamide)

Barium salt of calcium-di(2-hydrosulfato-1-octane-N-benzylsulfonamide)

Sodium salt of potassium-2-hydrosulfato-2-phenyl-1-decane-N-octylsulfonamide

Barium salt of sodium-2-hydrosulfato-2-ethyl-1-decane-N-nonylsulfonamide

Calcium salt of strontium-di(2-hydrosulfato-2-isobutyl-1-decane-N-methylsufonamide)

These compounds are represented graphically by the following formulae:

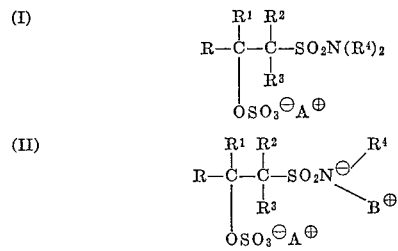

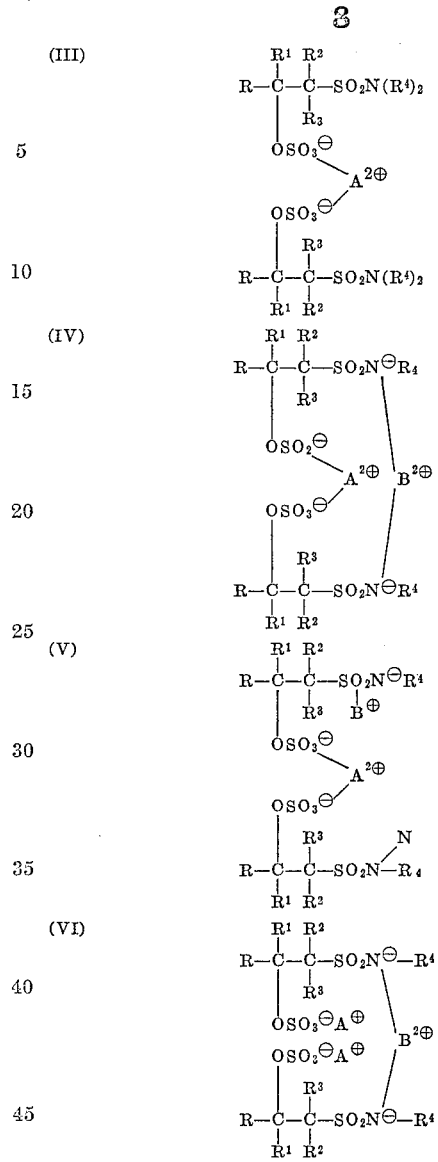

The olefinic starting materials for the reaction may be any compound containing an olefinic double bond, preferably in the terminal position, and containing a total of at least about 8 carbon atoms. The only limitation attaching to the olefinic starting material is that it be free of substituent groups, including R, $R^1$, $R^2$ and $R^3$ substituents, which are reactable with the sulfur trioxide complex used under the conditions of the reaction necessary to cause reaction with the olefinic double bond. The various sulfur trioxide complexes that may be used in this reaction have differing reactivities and some require elevated temperatures. Under some conditions, the intermediates may decompose faster than the reaction can proceed, in which event the yields of beta-sulfato derivatives may be lowered. Where the R, $R^1$, $R^2$ and $R^3$ groups are saturated alkyl radicals or cycloaliphatic radicals, no difficulty is experienced due to sulfonation occurring in the substituent group. Where the R, $R^1$, $R^2$ and $R^3$ groups are aryl, heterocyclic, or other slightly reactive groups that may sulfonate across a double bond within its structure, the reaction of this invention will still take place but certain precautions are necessary to prevent sulfonation of the substituent group. This is easily overcome by the choice of sulfur trioxide complex and the reaction temperature. The only disadvantage attaching to the use of the more complex aromatic, heterocyclic, or other somewhat reactable substituents, is that lower temperatures may be necessary and the reaction time is extended.

Accordingly, the following olefinic starting materials may be used in the reaction of this invention: octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, 3,3,5,5-tetramethylheptene-1, 1,1,2-trimethyl pentene-1, 4-propyl-5-methyl-6-ethyl octene-3, 3,3-dimethylhexene-4, 3,3-dibutylhexene-4, 3,3-dipropylhexene-4, 2,2-dimethylhexene-3, unsym.-diisopropylethylene, 2,3,4-triethylpentene-2, 2,3,4-trimethylpentene-2, 2,2,3-trimethylpentene-3, 2,3,3-tripropylpentene-1, and 2,5-dibutylhexene-3, as olefinic hydrocarbons.

Among the known aryl alkylene compounds that may be used as starting materials are phenylethylene, 1,1-diphenylethylene, tetraphenylethylene, triphenylethylene, sym. - diphenylethylene, and unsym. - diphenylethylene. Other starting materials include phenyltrimethylethylene, phenyltriethylethylene, phenyltributylethylene, phenyltripropylethylene, phenyltriisopropylethylene, phenyltriamylethylene, phenyltrihexylethylene, phenyltricyclopentylethylene, diphenyldimethylethylene, diphenyldibutylethylene, diphenyldiisopropylethylene, diphenyldicyclohexylethylene, methyltriphenylethylene, butyltriphenylethylene, propyltriphenylethylene, 3-methylphenyltrimethylethylene, naphthyltrimethylethylene, dinaphthyldimethylethylene 2-butyl-3-phenylpentene-2, 2,3-diphenylpentene-2, triphenylbutene-1, 2-isopropyl-3-naphtylpentene-2, 2,3-dinaphthylpentene-2, trinaphthylbutene-1, benzyltrimethylethylene, dibenzyldimethylethylene, naphthyldimethylethylene, 2-methyl-3-furylpentene-2, 2-methyl-3-thienylpentene-2, 2-propylthienylpentene-2, 2-butyl - 3 - furylpentene-2, trianthrylbutene-1, dianthryldimethylethylene, dianthryldiisopropylethylene, 2-hexyl-3-thienylpentene-2, 2-cyclohexyl-3-thienylpentene-2, and 2-cyclohexyl - 3 - furylpentene-2.

The amine radical A in the generic formula and the amine forming the sulfonamide configuration therein are derived from ammonia, or primary, secondary and tertiary amines of the formulae:

$$R_4NH_2, (R_4)_2NH, \text{ and } (R_4)_3N$$

(the tertiary amines not forming the sulfonamide) where $R_4$ may be hydrogen or in the case of ammonia, or is the same or different saturated or unsaturated, straight-chain or branched-chain hydrocarbon radical having 1 to 20 carbon atoms, and may be alkyl, aryl, alkaryl, aralkyl, cycloparaffinic, or heterocyclic in structure. Species of amines include:

| | |
|---|---|
| Methylamine | Triisopropylamine |
| Dimethylamine | Isobutylamine |
| Trimethylamine | Diisobutylamine |
| Ethylamine | Triisobutylamine |
| Diethylamine | Amylamine |
| Triethylamine | Isoamylamine |
| Propylamine | Diisoamylamine |
| Dipropylamine | Triisoamylamine |
| Tripropylamine | Tertiarybutylamine |
| Butylamine | Ditertiarybutylamine |
| Pentylamine | Tritertiarybutylamine |
| Dipentylamine | Undecylamine |
| Tripentylamine | Decylamine |
| Hexylamine | Diamylisopropylamine |
| Isohexylamine | Diamylhexylamine |
| Heptylamine | Dihexylamylamine |
| Triheptylamine | Diheptylmethylamine |
| Octylamine | Dioctylbutylamine |
| Dioctylamine | Dinonyloctylamine |
| Nonylamine | Didecylpropylamine |
| Dibutylamine | Didodecylbutylamine |
| Tributylamine | Dioctadecylamylamine |
| Isopropylamine | Aniline |
| Diisopropylamine | Triphenylamine |
| Decylamine | N,N'-ditolyl-p-phenylenediamines |
| Dodecylamine | N,N'-diphenyl-toluylenediamines |
| Trihexylamine | N,N'-diphenyl-naphthylenediamines |
| Cyclohexylamine | N,N'-ditolyl-naphthylenediamines |
| Dicyclohexylamine | β,β-dinaphthylamine |
| Tricyclohexylamine | Phenylenediamines |
| Cyclopentylamine | Morpholine |
| Dicyclopentylamine | Furfurylamine |
| Tricyclopentylamine | Tetrahydrofurfurylamine |
| Methylethylamine | Hexamethylenediamine |
| Dimethylethylamine | Decamethylenediamine |
| Diethylmethylamine | Propylenediamine |
| Ethylpropylamine | Ethylenediamine |
| Methylpropylamine | 3-nitropropylamine |
| Propylbutylamine | Di-α-naphthylamine |
| Isopropylisobutylamine | N,N'-diphenylbenzidine |
| Benzylamine | Phenyl-tolylamines |
| Ethyldecahydronaphthylamine | N,N'-ditolylbenzidines |
| Propyldecahydronaphthylamine | 5-carbomethoxyamylamine |
| Diethylcyclohexylamine | 5-carbamidoamylamine |
| Dimethylaminoethylamine  | Diethylaminoethylthioethylamine |
| Laurylamine | p-Ethoxycyclohexylamine |
| Guanidine | p-Propylthiocyclohexylamine |
| Oleylamine | Tridecyl amine |
| Eicosenylamine | Tetradecyl amine |
| N-oleyl ethylamine | Pentadecyl amine |
| Diphenylamine | Hexadecyl amine |
| Phenyl-α-naphthylamine | Heptadecyl amine |
| Phenyl-β-naphthylamine | Nonadecyl amine |
| Di-β-naphthylamine | Cyclopropyl amine |
| N,N'-di-β-naphthyl-p-phenylenediamine | Cyclobutyl amine |
| N,N'-diphenyl-p-phenylenediamine | Cycloheptyl amine |
| Ditolylamines | Decahydronaphthyl amine |
| Tolyl-naphthylamines | 4-ethoxy cyclohexylamine |

The reaction to form the β-sulfatosulfonamide is carried out by merely bringing together about 1 mol of olefinic reactant with about 2 mols of sulfur trioxide complex at temperatures best suited for the particular complex employed. In general, sulfur trioxide complexes react at temperatures between −10° to 120° C. A number of sulfur trioxide complexes are available for the reaction. Dioxane-sulfur trioxide, trimethylamine-sulfur trioxode, pyridine-sulfur trioxide, triethylamine-sulfur trioxide, dimethylformamide-sulfur trioxide, dioxane bis-sulfur trioxide, thioxane-sulfur trioxide, thioxane bis-sulfur trioxide and dimethylaniline-sulfur trioxide complexes may be used. There is a threshold temperature at which each complex becomes reactive. Consequently, the most suitable temperature range for the reaction will depend somewhat on the complexing agent used. The most suitable temperature range between −10° to 120° C. can be found by trial experiments. In general, the reactivities of the complexes is known in the art, and as in the case of pyridine-sulfur trioxide, a temperature between about 90° to 120° C. is suitable. It may be found that the intermediates decompose faster than they are formed, in which event lower temperatures and longer contact times will be necessary.

The reaction time may be from five minutes to one day and no pressure is required. Since the complexes are solids, they are used in solution or slurry form with an inert solvent. Suitable solvents include ethylene dichloride, ethylene trichloride, various organic esters such as ethyl acetate, butyl acetate, propyl acetate, unreactive naphthas or mineral oils, mineral spirits, VM & P naphtha, Stoddard solvent, and cyclohexane. With dioxane-sulfur trioxide as the reactant complexing agent, one expedient is to use an excess over the stipulated 2 molar quantity whereby the excess acts as a solvent for the reaction.

Other of the complexing agents may be used in this manner.

Agitation is applied to the reaction in a known manner or may be omitted, although its use shortens the reaction time.

A color change will be observed generally as an indication of the completion of the first stage of the reaction. Various other expedients, such as detection of unreacted olefin or complex, may be used to follow the reaction and determine when equilibrium has been reached.

The addition of the 2-mol quantity of ammonia or a primary or secondary amine, alone or mixtures thereof, or a mixture of a tertiary amine with a secondary or primary amine or ammonia is conducted gradually with continued agitation. This stage of the reaction is easily followed since the β-sulfatosulfonamides are solids and precipitate from the reaction mixture. Various known methods of separating the solid product may be used. Filtration under vacuum is one expedient, and centrifuging or settling may also be used. The product may be used per se without separation and recrystallization, although for most uses it is the better practice to separate and purify the end products. The products may be recrystallized from any of the solvents mentioned herein, or water may be used for this purpose. Identification is made through melting points, mixed melting points, refractive index, infrared analyses or analyses for the elements. The reaction may be conducted batchwise or on a continuous basis.

The step of forming the metal salt is carried out by using a solution of the base. Generally solutions of 0.1 to 2 N are sufficient, and aqueous solutions are preferred because emulsion difficulties are avoided and product separation is facilitated. However, either concentrated or dilute aqueous solutions may be used. The concentration of base and the temperature of this phase of the reaction are adjusted so that only neutralization reactions occur. The reaction proceeds without difficulty by adding one or two equivalents of base, or by simple titration to selected end points as determined by indicators. In some instances, the reaction can be completed by subjecting the reaction vessel containing the base and β-sulfatosulfonamide to the conditions of a steam bath.

To form the detergents of this invention the β-sulfatosulfonamides are reacted with any desired alkali metal base or alkaline earth base, such as the oxides or hydroxides, to form the metal salt or mixed salt. For these purposes bases of sodium, potassium, cesium, lithium, rubidium, calcium, barium, strontium, and magnesium may be used, and include sodium hydroxide, potassium hydroxide, cesium hydroxide, lithium hydroxide, rubidium hydroxide, calcium oxide, calcium hydroxide, barium oxide, barium hydroxide, barium hydroxide octahydrate, magnesium oxide, magnesium hydroxide, and strontium hydroxide. Mixtures of two or more of the foregoing bases may be used to form mixed salts, or the β-sulfonamides may be reacted sequentially with different bases. Thus not only are those salts contemplated which have a monovalent metal attached to both the sulfonamide group and the sulfato group, but also a single divalent metal may be attached through one valence bond to the sulfato group and through the other valence bond to the sulfonamide group, forming an internal salt. Also, a double salt such as the di-calcium salt of di-(2-hydrosulfato-1-decanesulfonanilide) may be a salt wherein either calcium atom is replaced by two monovalent alkali metals to form mixed salts. The term mixed salts means not only salts of different metals attached to the same 2-hydrosulfato-1-alkanesulfonamide molecule, but also mixtures of both alkali metal and alkaline earth metal salts wherein some of the salts are purely alkali metal salts and some are purely alkaline earth metal salts, or mixtures of different alkali metal salts and different alkaline earth metal salts.

Control of the reaction to form those salts wherein group A is ammonia, or a monoalkyl-, dialkyl-, or trialkyl-amino group, and group B is a metal, is obtained by variation of the molar amounts of the metal base used in the reaction. With some amines, such as aniline, the first step in the reaction of the 2-hydrosulfato-1-alkanesulfonanilide forms the mono- or di-metal salt of 2-hydrosulfato-1-alkanesulfonanilide using 1 mol of the base, and subsequent reaction with another mol of base forms the double salt wherein both groups A and B are a metal.

With other amines the 2-hydrosulfato-1-alkanesulfonamides initially formed have more of a tendency to form the sulfonamide salt, that is, attachment of the metal through the sulfonamide group, forming the series of salts shown in Table I where A is ammonia or other amino group and B is a metal. For this reaction only 1 mol of the base is required.

It is also contemplated that other metal salts may be formed including those of iron, cobalt, nickel, chromium, molybdenum, vanadium, antimony, zirconium, tin, lead, aluminum, zinc, cadmium, mercury, copper, silver, etc., although their utility as surfactants and detergents has not been established.

The embodiments of the invention in which an exclusive property or privilege is claimed are defined as follows:

1. β-sulfatosulfonamide of the group consisting of

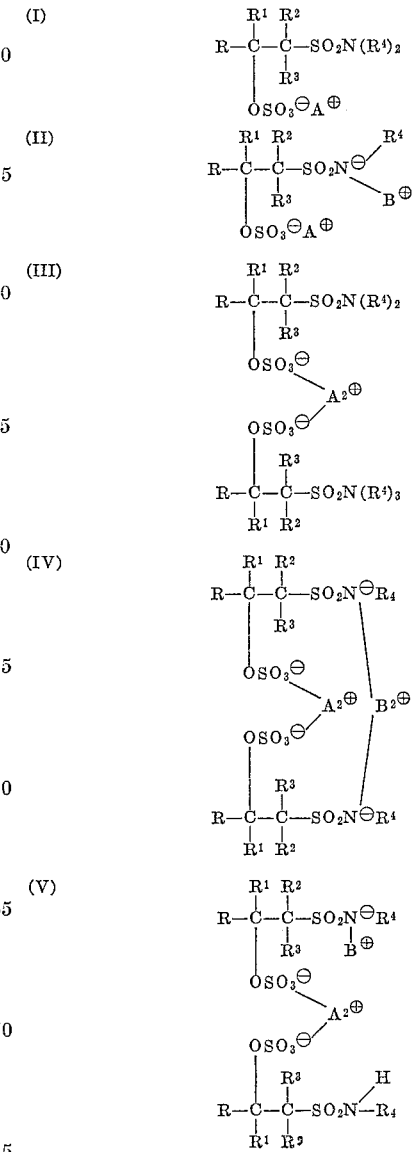

and (VI) 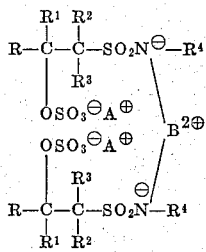

wherein each formula R is $C_4$ to $C_{20}$ alkyl, $R^1$, $R^2$, $R^3$ and $R^4$ are substituents of the group consisting of hydrogen, $C_1$ to $C_{20}$ alkyl, phenyl, naphthyl, anthryl, paramethyl phenyl, phenylethyl, phenylpropyl, cyclopentyl, cyclohexyl, benzyl, tolyl, thienyl, furyl, furfuryl, morpholino and tetrahydrofuryl, A is at least one member of the group consisting of $NH_4^\oplus$, $NH_3R^{4\oplus}$, $NH_2(R^4)_2^\oplus$, $NH(R_4)_3^\oplus$, alkali metal and alkaline earth metal, and B is a member of the group consisting of alkali metal and alkaline earth metal.

2. β-sulfatosulfonamide in accordance with claim 1 in which said compound has the formula of Formula I wherein R is decyl, $R^1$, $R^2$ and $R^3$ are hydrogen, one $R^4$ is phenyl and the other $R^4$ is hydrogen, and A is anilinium.

3. β-sulfatosulfonamide in accordance with claim 1 in which said compound has the formula of Formula I wherein R is decyl, $R^1$, $R^2$ and $R^3$ are hydrogen, one $R^4$ is phenyl and the other is hydrogen, and A is alkali metal.

4. β-sulfatosulfonamide in accordance with claim 1 in which said compound has the formula of Formula II wherein R is decyl, $R^1$, $R^2$ and $R^3$ are hydrogen, $R^4$ is phenyl, and A and B are alkali metal.

5. β-sulfatosulfonamide in accordance with claim 1 in which said compound has the formula of Formula I wherein R is octyl, $R^1$, $R^2$ and $R^3$ are hydrogen, one $R^4$ is phenyl and the other is hydrogen, and A is anilinium.

6. β-sulfatosulfonamide in accordance with claim 1 in which said compound has the formula of Formula III wherein R is octyl, $R^1$, $R^2$ and $R^3$ are hydrogen, one $R^4$ is phenyl and the other is hydrogen, and A is alkaline earth.

7. β-sulfatosulfonamide in accordance with claim 1 in which said compound has the formula of Formula IV wherein R is octyl, $R^1$, $R^2$ and $R^3$ are hydrogen, $R^4$ is phenyl and A and B are alkaline earth.

8. β-sulfatosulfonamide in accordance with claim 1 in which said compound has the formula of Formula I wherein R is undecyl, $R^1$, $R^2$ and $R^3$ are hydrogen, one $R^4$ is phenyl and the other is hydrogen, and A is anilinium.

9. β-sulfatosulfonamide in accordance with claim 1 in which said compound has the formula of Formula III wherein R is undecyl, $R^1$, $R^2$ and $R^3$ are hydrogen, one $R^4$ is phenyl and the other is hydrogen, and A is alkaline earth metal.

10. β-sulfatosulfonamide in accordance with claim 1 in which said compound has the formula of Formula V wherein R is undecyl, $R^1$, $R^2$ and $R^3$ are hydrogen, A is alkaline earth metal and B is alkali metal.

11. The anilinium salt of 2-hydrosulfato-1-dodecanesulfonanilide.

12. The mono-alkali metal salt of 2-hydrosulfato-1-dodecanesulfonanilide.

13. The mono-potassium salt of 2-hydrosulfato-1-dodecanesulfonanilide.

14. The di-alkali metal salt of 2-hydrosulfato-1-dodecanesulfonanilide.

15. The di-potassium salt of 2-hydrosulfato-1-dodecanesulfonanilide.

16. Barium di-(2-hydrosulfato-1-decanesulfonanilide).

17. The di-barium salt of di-(2-hydrosulfato-1-decanesulfonanilide).

18. The anilinium salt of 2-hydrosulfato-1-tridecane sulfonanilide.

19. Calcium di-(2-hydrosulfato-1-tridecane sulfonanilide).

20. Sodium-calcium di-(2-hydrosulfato-1-tridecane sulfonanilide).

21. Di-calcium di-(2-hydrosulfato-1-tridecane sulfonanilide).

References Cited by the Examiner

UNITED STATES PATENTS

| | | | |
|---|---|---|---|
| 2,229,744 | 1/41 | Kern | 260—457 XR |
| 2,632,766 | 3/53 | De Benneville | 260—457 |
| 2,666,788 | 1/54 | Ebel | 260—457 XR |
| 2,875,125 | 2/59 | Gaertner | 260—347.2 XR |
| 3,086,974 | 4/63 | Schlor et al. | 260—247.1 |

FOREIGN PATENTS 415,718  8/34  Great Britain.

CHARLES B. PARKER, *Primary Examiner.*

IRVING MARCUS, JOSEPH P. BRUST, *Examiners.*